United States Patent
Bunker et al.

(10) Patent No.: US 10,572,397 B2
(45) Date of Patent: Feb. 25, 2020

(54) MASKING STORAGE DEVICE PRESENCE

(71) Applicant: HEWLETT PACKARD ENTERPRISE DEVELOPMENT LP, Houston, TX (US)

(72) Inventors: Michael S. Bunker, Houston, TX (US); Michael White, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 231 days.

(21) Appl. No.: 15/283,114

(22) Filed: Sep. 30, 2016

(65) Prior Publication Data

US 2018/0095904 A1    Apr. 5, 2018

(51) Int. Cl.
*G06F 13/10* (2006.01)
*G06F 13/42* (2006.01)
*G06F 13/40* (2006.01)
*G06F 13/38* (2006.01)

(52) U.S. Cl.
CPC ........ *G06F 13/102* (2013.01); *G06F 13/4022* (2013.01); *G06F 13/4282* (2013.01); *G06F 13/385* (2013.01)

(58) Field of Classification Search
CPC .. G06F 13/102; G06F 9/30018; G06F 9/4812; G06F 21/78; G06F 2212/1052; G06F 2212/2141; G06F 13/4022; G06F 13/4072; G06F 13/385
See application file for complete search history.

(56) References Cited

U.S. PATENT DOCUMENTS

| | | | |
|---|---|---|---|
| 6,141,708 A * | 10/2000 | Tavallaei | G06F 13/4027 710/100 |
| 6,363,452 B1 | 3/2002 | Lach | |
| 6,742,034 B1 | 5/2004 | Schubert et al. | |
| 6,981,095 B1 | 12/2005 | MacLaren et al. | |
| 7,447,822 B2 | 11/2008 | Wu | |
| 8,291,208 B2 | 10/2012 | Thompson | |
| 8,554,957 B1 | 10/2013 | Wieland | |
| 8,825,911 B1 | 9/2014 | Wieland | |
| 9,122,623 B1 | 9/2015 | Wieland | |
| 9,141,571 B2 | 9/2015 | Subramaniyan et al. | |
| 9,384,093 B1 | 7/2016 | Aiello | |
| 2004/0243725 A1 * | 12/2004 | Yakovlev | G06F 13/4081 710/1 |
| 2014/0337540 A1 * | 11/2014 | Johnson | G06F 13/14 710/5 |

(Continued)

OTHER PUBLICATIONS

Dell, "Introduction to Software RAID," Software RAID, Article ID: SLN312377, Aug. 14, 2018, <https://www.dell.com/support/article/us/en/04/sln312377/software-raid?lang=en>.

(Continued)

*Primary Examiner* — Ernest Unelus
(74) *Attorney, Agent, or Firm* — Hewlett Packard Enterprise Patent Department

(57) ABSTRACT

An example method to hide a presence of a storage device is provided herein. The method masks the presence of the storage device using a microcontroller that controls a presence bit. The method unmasks the presence of the storage device using the array controller to instruct the microcontroller to change the value of the presence bit after installation is complete.

19 Claims, 5 Drawing Sheets

(56) References Cited

U.S. PATENT DOCUMENTS

2016/0078054 A1\* 3/2016 Klughart ................ G06F 13/00
710/313
2016/0118121 A1\* 4/2016 Kelly ................ G06F 13/4068
710/301

OTHER PUBLICATIONS

Dell, "Supported physical disks," Dell EMC FowerEdge RAID Controller S140 User's Guide, Mar. 2019, <https://www.dell.com/support/manuals/us/en/04/poweredge-rc-s140/perc_s140_ug_pub/supported-physical-disks?guid=guid-86acb55b-7c5e-4ed3-ad25-5729317bd146&lang=en-us>.

\* cited by examiner

MASKING STORAGE DEVICE PRESENCE

BACKGROUND

Non Volatile Memory Express (NVMe) drives utilize a Peripheral Component Interconnect Express (PCIe) connection rather than a Small Computer System Interface (SCSI) or Serial Attached SCSI (SAS) connection. When a new NVMe drive is added to a system the operating system (OS) recognizes the drive and install the standard drivers onto the drive. NVMe drives loaded with standard drivers are not suited for Redundant Array of Independent Disk (RAID) configurations. To enable RAID configurations, custom software drivers may be installed.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

A system utilizing Non Volatile Memory Express (NVMe) drives may not allow for easy installation of custom software drivers. An NVMe drive connects to a system via a Peripheral Component Interconnect Express (PCIe) connections. When a storage NMVe drive is added to the system the Operating System (OS) discovers and recognizes the device, At that point, the OS installs the standard drivers stored in the system onto the NVMe drive. The standard NVMe drivers are not configured to allow for Redundant Array of Independent Disk (RAID) configurations.

Various methods exist to work around the automatic install of the standard NVMe drivers, but most methods are costly and work intensive. One costly method includes creating NVMe drive products with unique PCIe IDs that are recognizable by a custom RAID driver. Another method is to add a non-transparent PCIe switch that hides the drive until a switch management processor configures an NMVe drives PCIe ID. As mentioned, both of these methods are costly and work intensive.

A system is provided to mask the storage device is provided herein. In order to mask the storage device, such as an NVMe drive, is to properly configure a PCIe ID and load the proper software drivers before the system recognizes the NVMe drive and installs the standard software driver. One system or method that allows the NVMe drive's PCIe ID configured and custom software drivers installed at a reasonable cost, is to hide the NVMe drive in a PCIe reset state while the NVMe drive is configured. The difference between hiding the NVMe drive in a PCIe reset state and the transparent PCIe switch method, mentioned above, is that hiding the NVMe drive in a PCIe reset state makes use of a low cost microcontroller which may also function as a hot plug controller.

Figure 1:
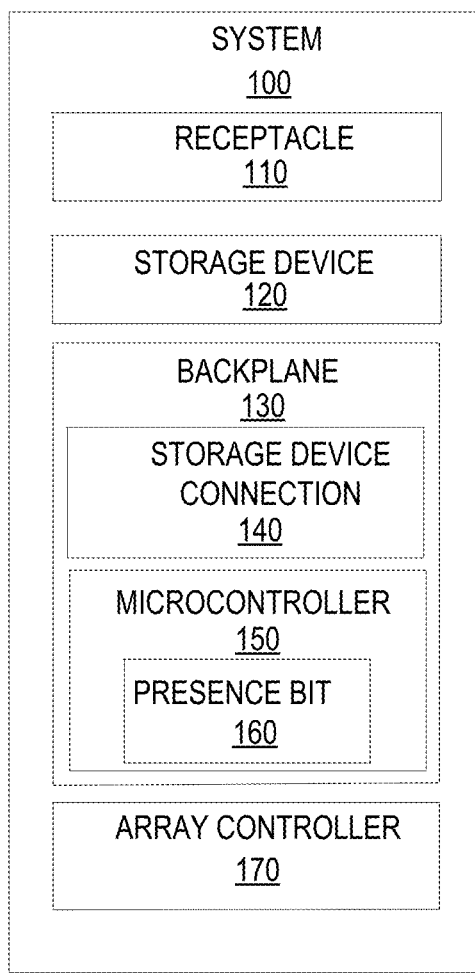
FIG. 1 illustrates a block diagram of a system for masking the presence of a storage device according to an example.

FIG. 1 illustrates a block diagram of a system 100 for masking the presence of a storage device 120. The system 100 comprises a receptacle 110 formed to receive different types of storage devices 120. The receptacle 110 is connected to a backplane 130. The backplane 130 includes storage device connections 140 and a microcontroller 150. The microcontroller 150 controls a presence bit 160. The presence bit 160, by default, is set to indicate to the microcontroller 150 that the presence of the storage device 120 is hidden from an operating system (OS) running on system 100. The microcontroller 150 is coupled to an array controller 170.

Figure 2:
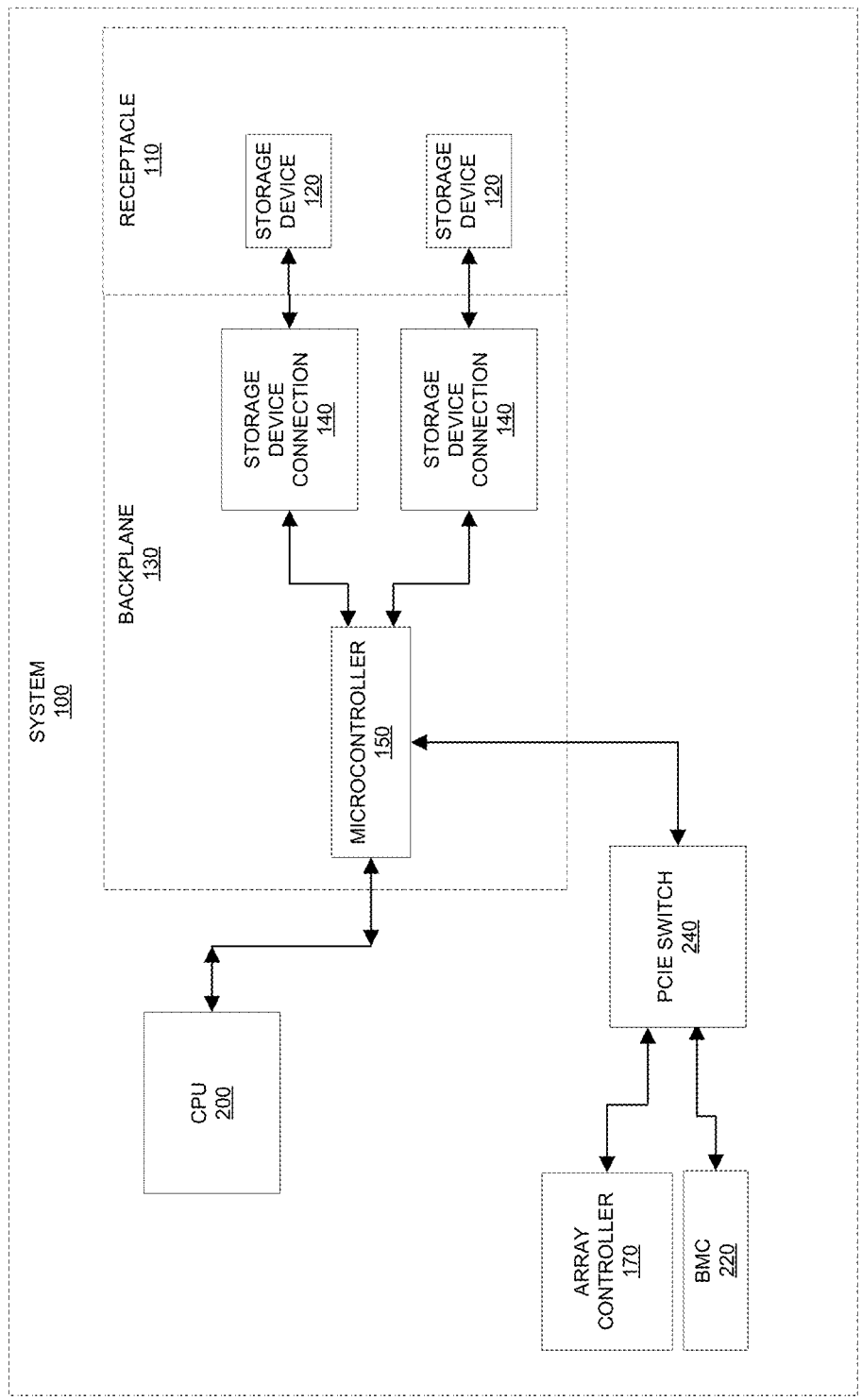
FIG. 2 illustrates a schematic diagram of a system for masking the presence of a storage device according to an example.

FIG. 2 illustrates a schematic diagram of a system 100 for masking the presence of a storage device 120. The system 100 may be a server or other computing system. Mask as defined herein is to conceal or to hide. The system 100 includes a receptacle 110 with a backplane 130. The receptacle 110 is formed to accept different types of storage devices 120, such as NVMe drives, other solid state drives (SSD), or hard disks. The backplane 130 includes a storage device connection 140 and a microcontroller 150. The microcontroller 150 contains and controls a presence bit 160. To set the presence bit 160 as defined herein is to set or change the presence bit 160 to a logical value. The logical value may be either a logical 0 or 1. The microcontroller 150 could include machine readable instructions to mask the presence of the storage device 120 if the logical value in the presence bit 160 is set to a 0 or a 1. If the presence bit 160 is set, upon the addition of a newly added storage device 120, the operating system (OS) of system 100 does not discover the storage device 120. The presence of the storage device 120 is masked from the OS of system 100 until the presence bit 160 is cleared by an array controller 170.

The microcontroller 150 of the system 100 is connected to an array controller 170. The array controller 170 scans the microcontroller 150 for new storage devices 120. After the storage device 120 is added to the system 100, the array controller 170 configures the storage device 120 and install machine readable instructions on the storage device 120. After the storage device 120 is configured and the machine readable instructions installed on the storage device 120, the array controller 170 then sends a signal to the microcontroller 150 to unmask the presence bit 160 on the microcontroller 150. If the storage device 120 utilizes a PCIe connection, the array controller 170 may configure the PCIe ID of the storage device 120. The machine readable instructions are custom software drivers that enable the storage device 120 to operate as part of a RAID. The presence of the storage device 120 may be masked, if the storage device 120 utilizes a PCIe connection, by keeping the storage device 120 in a PCIe reset state. The presence bit 160 may be set in the system's 100 BIOS. For example, the system 100, during power up, may enter BIOS mode upon a user's input. The user may then change the presence bit 160 if desired. The presence bit 160 may be set by default, thus hiding the presence of any new storage device 120 added. Default as defined herein is the initial setting in system 100 that sets the presence bit 160 value.

In addition, the storage device connection 140 on the backplane 130 can be a variety of different storage device connections 140 for storage devices 120. The storage device connections 140 may be any combination of NVMe, PCIe, SAS, SCSI, or any other storage connection. The microcontroller 150 may manage multiple storage device connections 140. Multiple microcontrollers 150 may be disposed on the backplane 130. Each microcontroller 150 may be associated with either the same type of storage device connections 140 or with different types of storage device connections 140. The microcontroller 150 could also control hot plug or hot swap events for the backplane 130. The microcontroller 150 could be coupled to the array controller 170 through a PCIe switch 240. The PCIe switch 240 may toggle between the array controller 170 and a Baseboard Management Controller (BMC) 220 or some other system management chip.

As discussed with reference to FIG. 2, the storage device's 120 presence may be masked by keeping the storage device 120 in a PCIe reset state. The storage device 120 in a PCIe reset state causes the OS of the system 100 to read the storage device 120 as powered off. The system 100 may have an Inter-Integrated Circuit (I2C) bus or a system management bus (SMBus), The I2C bus or SMBus connects to the CPU 200 and the array controller 170 or the PCIe switch 240. When a storage device 120 is added to the system 100, an install bit enables the OS to recognize that a storage device 120 is added to the system 100. If the presence bit 160 is set, the install bit is not sent to the CPU 200, thus hiding the presence of the storage device 120. After the storage device 120 is configured and the machine readable instructions installed, the array controller 170 clears the presence bit 160. Once the presence bit 160 is cleared, the install bit is sent to the CPU 200 via the I2C bus or SMBus. The OS recognizes that a storage device 120 is added to the system 100 and that the storage device 120 is loaded with machine readable instructions, in other words a custom software driver. The OS then waits for a power button press signal from the storage device 120 before a user is able to view the storage device 120 in the OS. Generating a power button press signal can be accomplished by pressing the power button on the storage device 120. The microcontroller 150 may also send a power button press signal upon clearing the presence bit 160. Once the presence bit 160 bit is cleared, the microcontroller 150 releases the storage device 120 from a PCIe reset state. The microcontroller 150 then sends a power button press signal via the 120 bus or SMBus and the storage device 120 appears in the OS.

Figure 3:
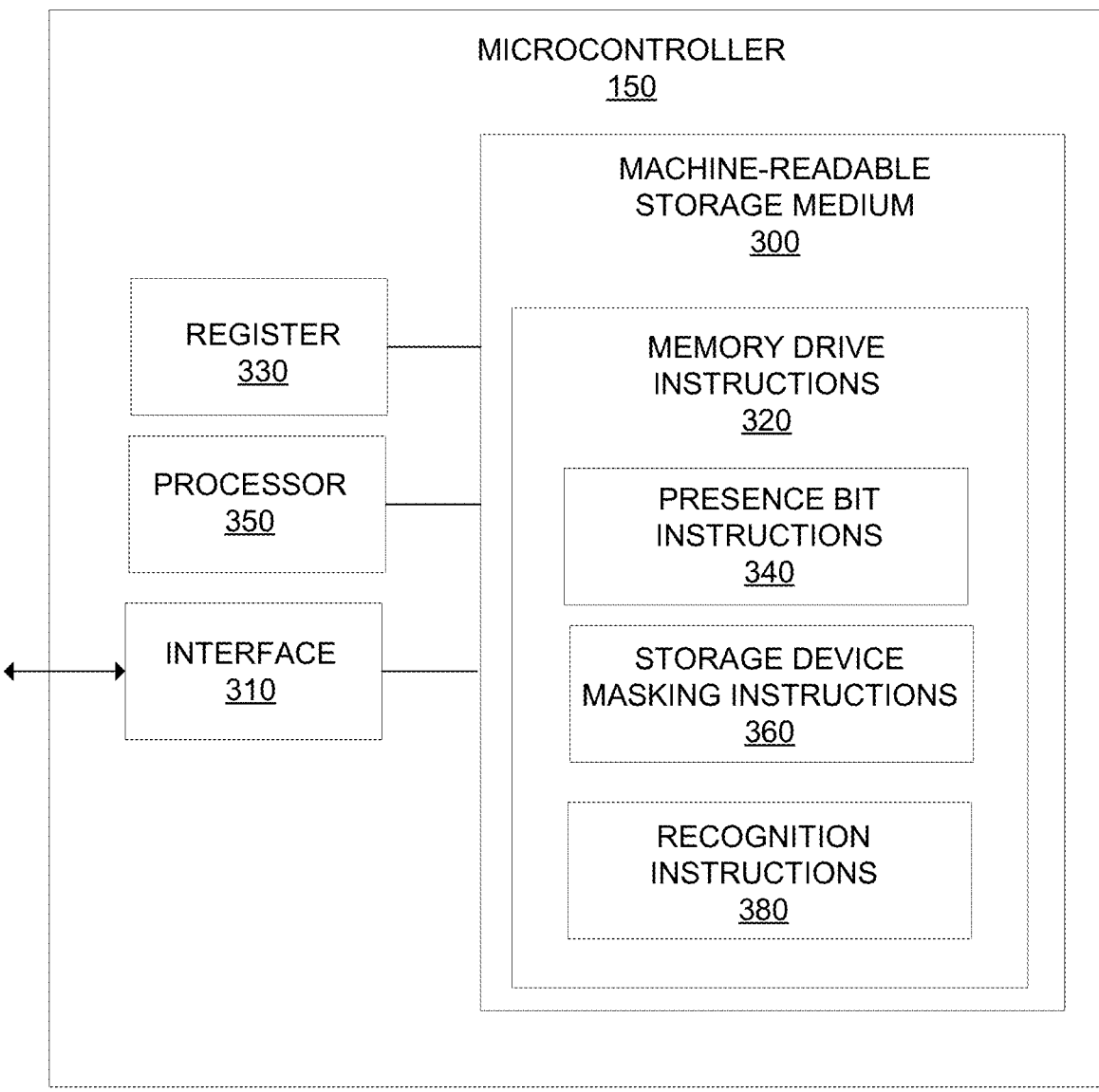
FIG. 3 illustrates a microcontroller to mask the presence of storage devices according to an example.
Figure 4:
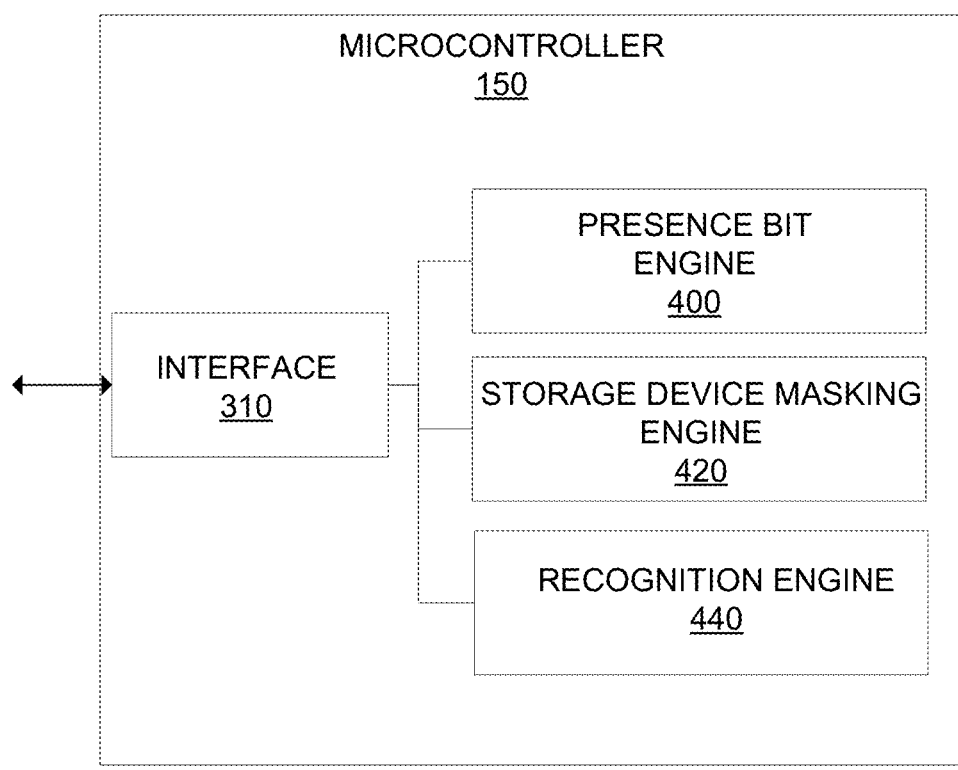
FIG. 4 illustrates a microcontroller to mask the presence of storage devices according to another example.

FIGS. 3-4 illustrate microcontrollers 150 to mask the presence of storage devices 120 according to examples. Referring to FIG. 3, a microcontroller 150 is illustrated. In certain aspects, the microcontroller 150 may correspond to multiple microcontrollers 150. Microcontrollers 150 may be implemented in various ways. For example, a microcontroller 150 may be a hot plug controller, hot swap controller, an integrated circuit, Field Programmable Gate Array (FPGA), NAND flash, peripheral interface controller (PIC), and/or any other type of circuit. In the example shown in FIG. 3, the microcontroller 150 may include a machine-readable storage medium 300, a register 330, a processor 350, and an interface 310.

The register 330 may be at least an 8-bit register and/or another hardware device to store bits. For example, the register 330 may store bits relevant to the states and devices monitored by the microcontroller 150.

The processor 350 may be at least one processing unit (CPU), microprocessor, and/or another hardware device to execute instructions to perform operations. For example, the processor 350 may fetch, decode, and execute memory drive instructions 320 (e.g., instructions 340, 360, and/or 380) stored in a machine-readable storage medium 300 to perform operations related to examples provided herein.

The interface 310 may be any device that facilitates the transfer of information between the microcontroller 150 and other components, such as an array controller 170, a BMC 220, and/or a storage device 120.

The machine-readable storage medium 300 may be any electronic, magnetic, or other physical storage device that stores executable instructions. Thus, machine-readable storage medium 300 may be, for example, memory and/or the like. In some implementations, machine-readable storage medium 300 may be non-transitory, such as a non-transitory computer-readable storage medium, where the term "non-transitory" does not encompass transitory propagating signals. The machine-readable storage medium 300 may be encoded with instructions that, when executed by processor 350, perform operations consistent with the examples herein. For example, the machine-readable storage medium 300 may include instructions that perform operations that mask the presence of a storage device 120. In the example shown in FIG. 2, the machine-readable storage medium 300 may be a memory resource that stores instructions that when executed cause a processing resource, such as processor 350 to implement a system 100 to mask the presence of a storage device 120. The instructions include memory drive instructions 320, such as presence bit instructions 340, storage device masking instructions 360, and recognition instructions 380.

Presence bit instructions 340 may function to set and clear a presence bit 160 associated with corresponding storage device connections 140 that may be masked if a storage device 120 is added or unmasked if a storage device 120 is configured. The presence bit 160 value represents a mask and unmask state. For example, when presence bit instructions 340 are executed by processor 350, the presence bit instructions 340 may cause the processor 340 of the microcontroller 150, and/or another processor to set or clear a presence bit 160 in the register 330 that corresponds to a storage device connection 140.

Storage device masking instructions 360 may function to hide a storage device 120 from the OS running on the system 100. For example, when the storage device masking instructions 360 are executed by the processor 350, the storage device masking instructions 360 may cause the processor 350 of the microcontroller 150, and/or another processor to set a newly added storage device 120 in a PCIe reset state. The storage device masking instructions 360 may also use a different method to hide the presence of a newly added storage controller.

Recognition instructions 380 may function to send a signal to an OS, so the OS recognizes a configured storage device 120. For example, when the recognition instructions 380 are executed by the processor 350, the recognition instructions 380 may cause the processor 350 of the microcontroller 150, and/or another processor send a signal to the OS to help the OS recognize a newly configured storage device 120.

Referring to FIG. 4, the microcontroller 150 is illustrated to include a presence bit engine 400, a storage device masking engine 420, and a recognition engine 440. In certain aspects, the microcontroller 150 may correspond to the microcontroller 150 of FIGS. 1-3. The microcontroller 150 may be implemented in various ways. For example, the microcontroller 150 may be a hot swap controller, hot plug controller, and/or any other suitable component or collection of components that mask the presence of a storage device 120.

The interface 310 may be any device that facilitates the transfer of information between the microcontroller 150 and external components. In some examples, interface 310 may include a PCIe interface device that allows the microcontroller 150 to receive and send data to and from a PCIe bus.

Engines 400, 420, and 440 include hardware and/or combinations of hardware and programming to perform functions provided herein. Moreover, the modules (not shown) can include programing functions and/or combinations of programming functions to be executed by hardware as provided herein. For example, the instructions for the engines may be processor-executable instructions stored on a non-transitory machine-readable storage medium and the hardware for the engines may include a processor to execute those instructions. In some examples, the functionality of engines 400, 420, and 440 may correspond to operations performed by the microcontroller 150 of FIGS. 1-3, such as operations performed when storage device masking instructions 360 are executed by processor 350. When discussing the engines and modules, it is noted that functionality attributed to an engine can also be attributed to the corresponding module and vice versa. Moreover, functionality attributed to a particular module and/or engine may also be implemented using another module and/or engine.

In FIG. 4, the presence bit engine 400 may represent a combination of hardware and instructions that perform operations similar to those performed when the processor 350 executes presence bit instructions 340. Similarly, the storage device masking engine 420 may represent a combination of hardware and instructions that perform operations similar to those performed when processor 350 executes storage device masking instructions 360, and recognition engine 460 may represent a combination of hardware and instructions that perform operations similar to those performed when the processor 350 executes recognition instructions 380.

Figure 6:
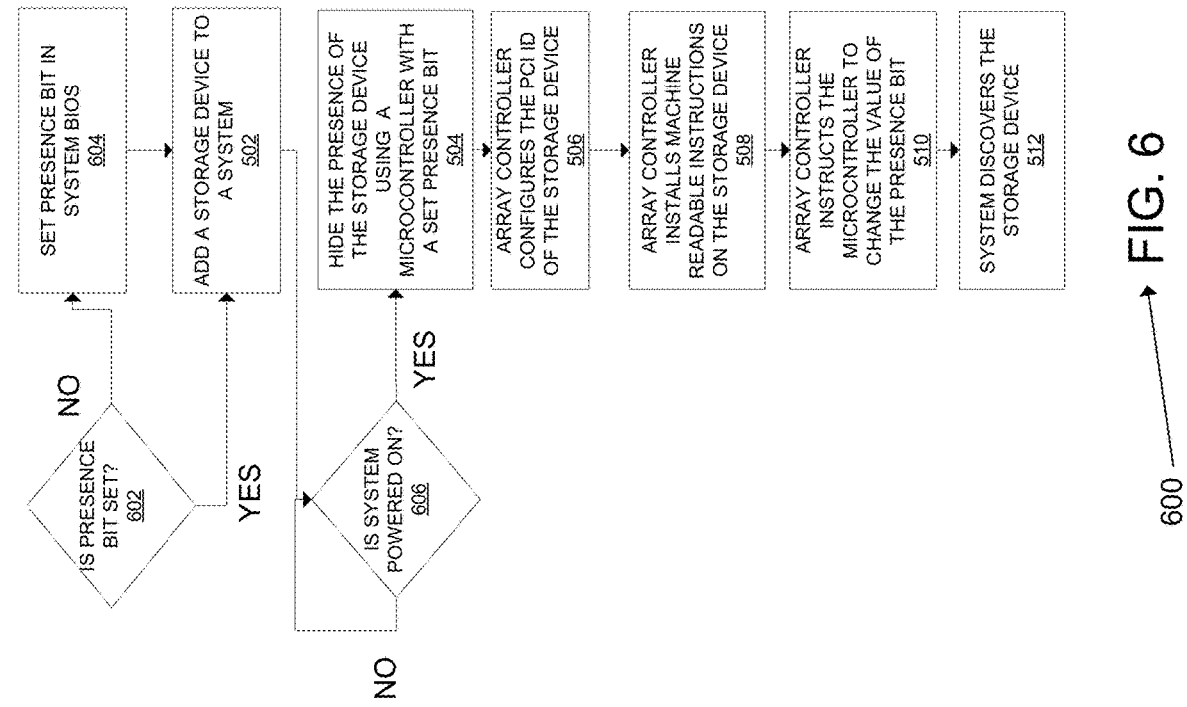
FIG. 6 illustrates a method for hiding the presence of a storage device according to another example.
Figure 5:
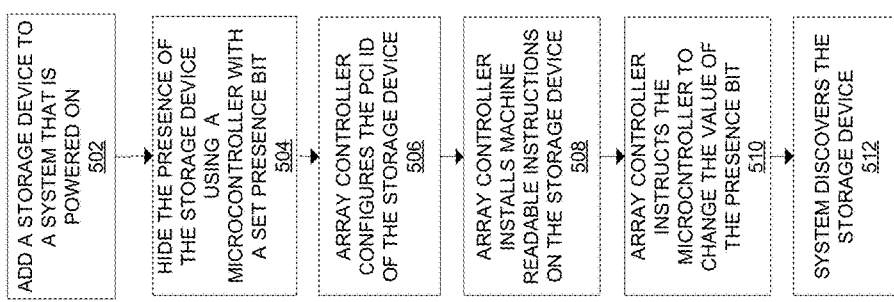
FIG. 5 illustrates a method for hiding storage device presence according to an example.

The disclosed examples may include systems, devices, computer-readable storage media, and methods for generating a natural language programming tool. For purposes of explanation, certain examples are described with reference to the components illustrated in FIGS. 3-4. The functionality of the illustrated components may overlap and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples, FIGS. 5-6 illustrate methods 500, 600 for hiding the presence of a storage device. One method 500, as illustrated in FIG. 5, hides the presence of a storage device until the storage devices PCIe ID, if the storage device utilizes PCIe connections, is configured and custom software drivers are installed. In block 502, a storage device is added to a system that is powered on. The system may also be powered off, in which case the method does not proceed until the system is powered on. In block 504, the presence of a storage device is masked using a microcontroller. The microcontroller hides the storage device if the presence bit is set. The presence bit may be set by default and can be updated in the system's BIOS. If the presence bit is not set, the OS recognizes the added drive and proceed to install the standard drivers. After the storage device is added, as shown in block 504, an array controller configures the PCIe ID of the storage device. In block 506, the array controller loads machine readable instructions, in other words a custom software driver, on the storage device. After the storage device's PCIe ID is configured and the machine readable instructions are installed on the storage device, as shown in block 510, the array controller instructs the microcontroller to change the value of the presence bit. In block 512, once the presence bits value is changed to a value that indicates that the storage device should not be hidden, the storage device is now discoverable by the system. The system then recognizes the NVMe drive as part of a RAID configuration.

In FIG. 6, method 600, additional steps are included. In block 602, if the presence bit is not set, the next step may be to set the presence bit in the system's BIOS. The presence bit does not have to be set if the user wishes the storage device to be loaded with the standard drivers included with the OS. After the presence bit is set or if it had already been set, as shown in block 502, a storage device is added to the system. In block 606, a verification that the system is powered on occurs. The method does not continue until the server is powered on. A user may also be notified, upon addition of a storage device, that the presence bit is not set and that the storage device may be loaded with the standard drivers. Another alternative, includes the option to update the presence bit through the BMC, rather than booting into BIOS each time a user wishes to set or clear the presence bit.

Although the flow diagram of FIGS. 5-6 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims

What is claimed is:

1. A system for masking a presence of a storage device comprising:
    a receptacle to receive the storage device, the receptacle connected to a backplane, wherein the backplane includes a storage device connection;
    a microcontroller coupled to the receptacle, the microcontroller to control a presence bit, the presence bit set to mask the presence of the storage device; and
    an array controller coupled to the microcontroller, the array controller set to install a driver on the storage device and cause the microcontroller to unmask the presence bit on the microcontroller upon completion of installation, wherein the driver is not included with an operating system of the system.

2. The system of claim 1, wherein the storage device comprises a solid state drive.

3. The system of claim 2, wherein the solid state drive is a Non-Volatile Memory Express (NVMe) drive.

4. The system of claim 1, wherein the storage connection is a Peripheral Component Interface Express (PCIe) connection.

5. The system of claim 1, wherein the microcontroller hides the presence of the storage device by keeping the storage device in a PCIe reset state.

6. The system of claim 1, wherein the microcontroller is coupled to the array controller via a PCIe switch.

7. The system of claim 1, wherein the presence of the storage device is masked from an operating system on the system.

8. The system of claim 1, further comprising two storage device connections associated with one microcontroller.

9. The system of claim 1, wherein the microcontroller is a hot plug controller.

10. The system of claim 1, wherein the storage device is configured by altering the storage device's PCIe ID.

11. The system of claim 1, wherein the presence bit is altered in a Basic Input/Output System (BIOS).

12. A non-transitory machine readable memory resource storing instructions that when executed cause a physical processing resource to mask the presence of a storage device, the instructions comprising:
    a presence bit instruction executable to set a presence bit to a value representing a mask state and an unmask state;
    a storage device masking instruction executable to, in response to insertion of the storage device into a computing system and the value of the presence bit representing the mask state, place the storage device in a PCIe reset state and, in response to installation of a driver other than drivers included on an operating system of the computing system on the storage device by an array controller, remove the storage device from the PCIe reset state; and
    a recognition instruction executable to write to the computing system.

13. The non-transitory machine readable memory resource of claim 12, wherein the storage device masking instruction removes the storage device from a PCIe reset state when the presence bit is set to the unmasked state.

14. The non-transitory machine readable memory resource of claim 12, wherein the computing system recognizes the storage device upon a write from the recognition instruction.

15. A method for hiding a presence of a storage device until the storage device is configured comprising:
    adding the storage device to a system;
    masking, by a hot plug controller, the presence of the storage device, wherein the hot plug controller controls a presence bit set to a value to instruct the microcontroller to hide the storage device;
    configuring, by an array controller, a PCIe ID of the storage device and installing a driver on the storage device, wherein the driver is included on the array controller and is different than the drivers included with an operating system of the system;
    in response to a completion of configuration of the storage device by the array controller, instructing, by the array controller, the hot plug controller to unmask the presence of the storage device; and
    in response to a reception of an instruction from the array controller by the hot plug controller, unmasking, by the hot plug controller, the presence of the storage device by changing the value of the presence bit.

16. The method of claim 15, wherein the storage device is an NVMe drive.

17. The method of claim 15, wherein the presence bit is set by default to the value to instruct the hot plug controller to hide the storage device.

18. The method of claim 15, wherein the driver enables the storage device to operate as part of a Redundant Array of Independent Disks (RAID).

19. The method of claim 15, wherein the system is powered on prior to insertion of the storage device that is added.

* * * * *